US012307327B1

(12) United States Patent
Rothschild (10) Patent No.: US 12,307,327 B1
(45) Date of Patent: May 20, 2025

(54) METHOD AND AN ELECTRONIC DEVICE TO DECODE A MICRO ENCRYPTED CODE

(71) Applicant: Leigh M. Rothschild, Miami, FL (US)

(72) Inventor: Leigh M. Rothschild, Miami, FL (US)

( * ) Notice: Subject to any disclaimer, the term of this patent is extended or adjusted under 35 U.S.C. 154(b) by 0 days.

(21) Appl. No.: 18/909,703

(22) Filed: Oct. 8, 2024

(51) Int. Cl.
*G06K 7/14* (2006.01)
*G06T 3/4053* (2024.01)
*G06T 5/70* (2024.01)
*G06T 19/00* (2011.01)
*H04N 23/69* (2023.01)

(52) U.S. Cl.
CPC ......... *G06K 7/1447* (2013.01); *G06K 7/1417* (2013.01); *G06K 7/1443* (2013.01); *G06T 3/4053* (2013.01); *G06T 5/70* (2024.01); *G06T 19/006* (2013.01); *H04N 23/69* (2023.01); G06T 2207/20084 (2013.01); G06T 2207/20192 (2013.01)

(58) Field of Classification Search
CPC .. G06K 7/1447; G06K 7/1417; G06K 7/1443; G06T 3/4053; G06T 5/70; G06T 19/006; G06T 2207/20084; G06T 2207/20192; H04N 23/69
See application file for complete search history.

(56) References Cited

U.S. PATENT DOCUMENTS

| 7,992,773 | B1 | 8/2011 | Rothschild | |
|---|---|---|---|---|
| 8,424,752 | B2 | 4/2013 | Rothschild | |
| 8,651,369 | B2 | 2/2014 | Rothschild | |
| 8,936,190 | B2 | 1/2015 | Rothschild | |
| 9,785,814 | B1 * | 10/2017 | Todeschini | G06K 7/1426 |
| 10,146,975 | B2 | 12/2018 | Canini et al. | |
| 11,216,629 | B2 | 1/2022 | Liang et al. | |
| 11,803,719 | B1 | 10/2023 | Biasini et al. | |
| 2010/0219247 | A1 | 9/2010 | Nakata | |
| 2020/0193112 | A1 * | 6/2020 | Pang | G06K 7/1439 |

OTHER PUBLICATIONS

*Symbology Innovations, LLC v. Dexcom, Inc.*, No. 2:23-CV-00473-JRG, 2024 WL 3543409, at *1 (E.D. Tex. Jul. 25, 2024).

* cited by examiner

*Primary Examiner* — Matthew Mikels
(74) *Attorney, Agent, or Firm* — Dobbin IP Law, P.C.; Geoffrey E. Dobbin (57) ABSTRACT

The present disclosure relates to an electronic device for decoding encrypted codes, particularly micro QR codes, using advanced imaging, AI neural networks, and processing techniques. The device includes a high-performance processor, high-resolution image sensors, a LiDAR sensor, and a magnification unit with digital and optical zoom capabilities. The device captures images of encrypted codes, determines their size, and performs iterative magnification and enhancement to improve legibility. The decoding process is powered by a pre-stored database and dynamically adjusts settings based on real-time feedback and AI-driven analysis. The AI neural network is trained to repair incomplete or partially captured codes, enhancing the decoding accuracy even under suboptimal conditions. The device includes an AR unit for visual guidance to help the user position the device correctly. A notification unit provides visual and auditory cues. This combination of hardware, software, and AI components ensures efficient and accurate decoding of very small codes.

14 Claims, 3 Drawing Sheets

METHOD AND AN ELECTRONIC DEVICE TO DECODE A MICRO ENCRYPTED CODE

TECHNICAL FIELD

The present disclosure pertains to an electronic device and a method for decoding encrypted codes, in particular those that are exceedingly small, such as micro QR codes. In particular, the present disclosure relates to improving the accuracy and efficiency of identifying, capturing, magnifying, and decoding the encrypted codes using advanced image processing techniques, sensor data integration, and machine learning models.

BACKGROUND

Conventionally, there is a difficulty in decoding very small, encrypted codes, such as micro QR codes, accurately and efficiently, especially under suboptimal conditions. Codes smaller than a certain size are difficult to capture and decode due to their tiny dimensions. Low-resolution images, poor lighting, and incorrect viewing angles can make it difficult to decode the encrypted codes. Magnification increases the code size sufficiently without losing clarity. Conventional devices use standard image sensors to capture images of encrypted codes. Standard sensors often lack the resolution and sensitivity to accurately capture the fine details of very small, encrypted codes, especially in poor lighting or at unfavorable angles. The result is blurred or pixelated images that are difficult to decode. Simple digital zoom techniques are used to enlarge the image of the encrypted code. Digital zoom simply enlarges the image without adding detail, often resulting in pixilation and loss of clarity. This can result in the small details of micro QR codes becoming indistinguishable, making the decoding process more difficult. Predefined image enhancement algorithms, such as contrast adjustment and sharpening, are used to improve image quality. These algorithms are often static and do not adapt to changing conditions such as lighting and angles. As a result, they cannot sufficiently enhance images captured under sub-optimal conditions, resulting in inaccurate decoding. Typically, devices rely on a single type of sensor, such as a camera, to capture and decode encrypted codes. Single-sensor systems lack the depth and detail that multiple sensors provide. This can lead to inaccuracies in sizing and code detection, especially with very small or very detailed codes. In addition, users must manually adjust the position, lighting, and zoom of the device to obtain a clear image of the encrypted code. This approach is time-consuming and prone to human error. Users may struggle to find the optimal conditions for capturing the code, leading to frustration and inconsistent results. Electronic devices use fixed settings for decoding encrypted codes based on general parameters. These fixed settings do not consider the specific characteristics of different code types or environmental conditions. This rigidity can lead to failed decoding attempts if the settings are not optimal for the current scenario. Some devices use machine learning models trained on static data sets to support decoding. Traditional machine-learning models may not adapt well to new types of encrypted codes or changing environmental conditions. Also, traditional machine-learning models cannot be continuously improved based on real-time feedback, which limits their effectiveness over time. As a result, there is a need for a method and an electronic device to decode a micro encrypted code.

US20100219247A1 describes a symbol-reading device that uses a relatively straightforward mechanism based on image capture and size detection. The device consists of an imaging section that captures the symbol and a detecting section that determines the size of the captured symbol. Based on this size detection, the device uses a judging section to compare the symbol's size against a pre-set value. Depending on whether the symbol is larger or smaller than this threshold, a focus movement controlling section adjusts the focus of the imaging section to a predetermined closer or farther position. Once the focus is optimized, an analyzing section processes the image to extract symbol data. The key focus of this device is on adjusting the focal length based on symbol size to ensure clear image capture for effective symbol reading. In contrast to US20100219247A1, the present disclosure describes an advanced electronic device specifically designed for decoding encrypted codes, such as micro QR codes, using a combination of sophisticated imaging techniques and AI-powered processing. This device includes a processor, memory, and image sensors that work together to identify and capture the encrypted code. It goes beyond simple image capture and size detection by incorporating a range of real-time image enhancement techniques like super-resolution, noise reduction, and edge sharpening. The device also uses a neural network model to repair damaged or missing portions of the code, improving the chances of successful decoding even under challenging conditions. Additionally, the device offers AR overlays to guide the user for optimal image capture and provides feedback if decoding fails. The system's AI continuously learns and updates based on decoding attempts, ensuring more accurate results over time. This device is heavily focused on leveraging AI, AR, and advanced processing techniques for highly accurate and reliable decoding of small and complex encrypted codes.

U.S. Pat. No. 11,803,719B1 describes a system focused on decoding optical patterns like barcodes using a camera with adjustable magnification. Initially, the camera captures the first image of the scene at a low magnification, which may include a barcode. If the resolution of this initial image is insufficient for decoding the barcode, the system automatically increases the magnification by a predetermined factor and captures a second image at the enhanced zoom level. The barcode is then decoded based on this second, higher-resolution image. This process relies on a step-by-step, incremental magnification strategy to ensure that the barcode is eventually captured in a resolution adequate for decoding. In contrast to U.S. Pat. No. 11,803,719B1, details an electronic device designed specifically for decoding encrypted codes, such as micro QR codes, using advanced imaging and AI-driven techniques. The device identifies the encrypted code and, if it is too small, applies magnification to the captured image. Beyond just magnification, the device enhances the image in real time using techniques like super-resolution and noise reduction. It also employs a neural network model to repair damaged or incomplete portions of the code. The decoding process is further optimized using a pre-stored database of settings that adjust dynamically based on environmental conditions. Additionally, the device incorporates augmented reality (AR) overlays that guide the user for optimal image capture and provide notifications if decoding fails. The AI model continuously learns from previous decoding attempts to improve accuracy over time. This system combines high-performance hardware, sophisticated image processing, and AI algorithms to decode complex, encrypted codes even under challenging conditions.

U.S. Pat. No. 10,146,975B2 describes a data reader designed for capturing and decoding optical labels, focusing on an advanced hybrid autofocus system. This system uses both active and passive autofocus modes, intelligently switching between them depending on decoding success. Initially, the active autofocus mode uses a rangefinder to measure the distance between the reader and the target item, adjusting the lens focus accordingly. If the decoding engine is unable to decipher the optical label, the system switches to the passive autofocus mode, where it analyzes image contrast and identifies optimal focal planes for focusing, without relying on the rangefinder. This approach enhances the accuracy and reliability of reading optical codes in various scenarios. In contrast to U.S. Pat. No. 10,146,975B2, present disclosure discusses an electronic device specialized in decoding encrypted codes, such as micro QR codes, using a combination of advanced imaging and AI-driven processing techniques. The device captures an image of the encrypted code, determines its size, and applies magnification and real-time image enhancements like super-resolution and edge sharpening to improve clarity. A neural network model is utilized to repair damaged or incomplete code sections, facilitating accurate decoding. The device also includes augmented reality (AR) overlays that guide the user in positioning the device for optimal capture, along with feedback notifications for improving decoding success. This solution integrates AI, real-time processing, and AR guidance for highly effective decoding in challenging conditions.

U.S. Pat. No. 11,216,629B2 focuses on a computer-implemented method for positioning and identifying two-dimensional codes (e.g., QR codes). The process involves obtaining multiple images that represent reference codes, and then comparing them with a sample two-dimensional code to determine the best match. Once the matching image is identified, the global features of the reference codes are aligned based on this sample code. The process is then used to train a model for two-dimensional code positioning and identification. Additionally, the method improves the accuracy of identifying codes captured in complex scenarios by performing global feature positioning, focus adjustments, and decoding based on predetermined image resolution. The core emphasis here is on enhancing the identification and positioning of two-dimensional codes by leveraging a specialized model and optimizing image analysis techniques. In contrast to U.S. Pat. No. 11,216,629B2, present disclosure describes an electronic device designed to decode encrypted codes, particularly focusing on micro QR codes, through advanced imaging and AI-driven techniques. This device includes a processor and memory that work together to capture an image of an encrypted code and determine if it needs magnification. The device then enhances the image using techniques like super-resolution and noise reduction and repairs damaged portions of the code using a neural network model. The device decodes the encrypted code by dynamically adjusting parameters based on the type of code and environmental conditions. Additionally, the device provides augmented reality (AR) guidance to help users position it optimally for capturing the code and offers visual and auditory notifications if decoding fails. The device combines hardware (e.g., sensors, magnification units) and software (e.g., AI models, AR overlays) to improve the accuracy of decoding small or partially damaged codes, especially in challenging conditions.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments disclosed herein, an electronic device for decoding an encrypted code is disclosed. The electronic device includes a processor, and memory, communicatively coupled to the processor is disclosed. In an embodiment, the memory stores processor-executable instructions that, when executed, cause the processor to identify an encrypted code on a surface and capture an image of the encrypted code using one or more image sensors. In an embodiment, the processor is configured to determine whether the size of the encrypted code is less than a predefined size using one or more sensors. In an embodiment, the processor is configured to perform a magnification operation on the image to increase the size of the encrypted code and in an embodiment, the processor is configured to decode the encrypted code based on the increased size of the image. In an embodiment, the decoding of the encrypted code is performed based on a pre-stored database stored in the electronic device. In an embodiment, the pre-stored database comprises a plurality of settings for decoding the encrypted code. In an embodiment, the encrypted code corresponds to a micro QR code or a code having a size of less than $\frac{1}{8}$ inch×$\frac{1}{8}$ inch (3 mm×3 mm). In an embodiment, the processor is configured to determine one or more settings to be applied for decoding the encrypted code based on at least one of the resolution values of the image, illumination conditions, angle of approach, and a magnification value used during the magnification operation. The processor utilizes an AI module trained on historical data and environmental conditions to optimize these settings for more accurate and faster decoding. In an embodiment, the processor is configured to perform real-time enhancement of the captured image using one or more advanced image processing techniques, including at least one of super-resolution, noise reduction, and edge sharpening, with AI-driven algorithms dynamically adjusting these enhancements based on the specific characteristics of the encrypted code and its surroundings. In an embodiment, the processor is configured to perform the magnification process iteratively until the encrypted code is decrypted. The AI module assists in analyzing the intermediate results from each magnification step, identifying patterns or symbols within the code, and determining if further magnification or image adjustments are needed.

In an embodiment, the magnification process is performed within a predefined time. The predefined time is between 1 ms-100 ms, and the magnification operation includes digital zoom and optical zoom capabilities. The AI dynamically selects the optimal zoom type based on current image quality, environmental conditions, and feedback from one or more image sensors, enhancing the overall decoding accuracy. In an embodiment, the processor is configured to provide a notification to the user of the electronic device to capture the image if decoding of the encrypted code fails after iteratively performing the magnification operation. The notification is provided using a visual cue and/or an audible cue. The processor also utilizes augmented reality (AR) techniques to overlay visual guidance on a display screen of the electronic device, assisting the user in correctly positioning the device to capture and decode the encrypted code. The AI module refines this guidance based on real-time analysis of the code's visibility and the device's alignment.

In an embodiment, the processor integrates an AI model specifically trained to recognize and decode various encrypted symbologies, including micro QR codes. The AI model leverages neural network-based algorithms to analyze the structure of the encrypted code, even under suboptimal lighting, focus, or angle conditions. The AI can predict missing or unclear sections of the code based on known symbology patterns, assisting the processor in completing the decoding process more efficiently. The AI system also features a feedback loop that continuously improves the model by analyzing successful and failed decoding attempts, enabling more accurate and faster decoding in future operations.

In an embodiment, one or more sensors are configured to determine the size of an encrypted code, and one or more sensors comprise a LiDAR sensor. The processor is configured to perform a pre-scan of the environment to identify optimal conditions for detecting the encrypted code, wherein the optimal conditions include matching ambient light, angle of incidence, and potential obstructions. In an embodiment, the processor is configured to dynamically adjust the magnification operating parameters based on real-time feedback from the decoding process. In an embodiment, the processor is configured to use a neural network AI machine learning model to improve the accuracy and speed of decoding the encrypted code based on historical data and environmental conditions, and the neural network model/AI is trained to recognize and decode one or more types of encrypted codes, including micro QR codes, even under sub-optimal illumination and focus conditions, and the processor is configured to provide a feedback loop in which a decoding success rate is used to continuously train and update the neural network model/AI, thereby improving future decoding performance. In an embodiment, it further comprises a multi-sensor fusion unit configured to combine data from LiDAR, depth sensors, and image sensors to create a 3D model of the surface, thereby improving the accuracy of sizing and decoding of the encrypted code.

In an embodiment, a method for decrypting an encrypted code, by an electronic device identifies an encrypted code located on a surface and captures an image of the encrypted code using one or more image sensors. In an embodiment, the method for decrypting an encrypted code by the electronic device determines that the size of the encrypted code is smaller than a predefined size using one or more sensors. In an embodiment, a method for decrypting an encrypted code, by the electronic device performs a magnification operation on the image to increase the size of the encrypted code. In an embodiment, the method comprises decoding the encrypted code by the electronic device based on the enlarged size of the image. In an embodiment, the decoding of the encrypted code is performed based on a pre-stored database stored in the electronic device. The pre-stored database comprises a plurality of settings for decoding the encrypted code, and the encrypted code corresponds to a micro QR code or a code smaller than ⅛ inch×⅛ inch. In an embodiment, the method comprises determining one or more settings to be applied to decode the encrypted code based on at least one of the resolution values of the image, the illumination lighting conditions, the angle of approach, and a magnification value being used by the magnification operation. In an embodiment, the method comprises performing real-time enhancement of the captured image using one or more advanced image processing techniques comprising at least one super-resolution, noise reduction, and edge sharpening to facilitate the decoding process.

In an embodiment, the method incorporates an AI module designed to repair otherwise unreadable or damaged encrypted codes. The AI is trained to recognize patterns within encrypted codes, even when parts of the code are missing, obscured, or distorted due to poor image quality, suboptimal lighting, or wear on the surface where the code is located. The AI identifies common patterns or symbols within the encrypted code, allowing it to predict and reconstruct damaged or missing sections based on known symbology structures. The AI applies machine learning techniques to fill in gaps or correct distortions in the code. This process involves analyzing the captured image and enhancing the data to make the code legible, even when it would be unreadable using conventional methods. The AI performs iterative enhancements and magnifications, analyzing intermediate results at each step to optimize the final decoded output. This is particularly effective for micro QR codes or other intricate symbologies that require precise decoding. The AI model learns from each decoding attempt, incorporating successful and unsuccessful decoding cases into its training, thereby continuously improving its accuracy and efficiency over time. This AI-enhanced decoding method ensures that even encrypted codes that are partially degraded, poorly captured, or subject to challenging environmental conditions can still be reliably decoded.

In an embodiment, the method comprises iteratively performing the enlarging operation until the encrypted code is decrypted, and the enlarging operation is performed within a predefined time, wherein the predefined time is between 1 ms-100 ms and the enlarging operation comprises digital zoom and optical zoom functions. In an embodiment, the method comprises dynamically selecting an optimal zoom type based on current image quality and feedback from one or more image sensors. In an embodiment, the method comprises providing a notification to a user of the electronic device for capturing the image if the decryption encrypted code fails after iteratively performing an enlargement operation, and the notification is provided using at least a visual cue and an audible cue. In an embodiment, the method comprises using augmented reality (AR) techniques to overlay a visual guide, on a display screen of the electronic device to assist the user in correctly positioning the electronic device to capture and decrypt the encrypted code.

In an embodiment, one or more sensors are configured to determine the size of an encrypted code, and one or more sensors comprise a LiDAR sensor. In an embodiment, the method comprises performing a pre-scan of the environment to determine optimal conditions for detecting the encrypted code. The optimal conditions include adapting to the ambient light, the angle of incidence, and possible obstacles. In an embodiment, the method comprises dynamically adjusting the magnification operating parameters based on real-time feedback from the decoding process. In an embodiment, the method comprises using a neural network model/AI to improve the accuracy and speed of decoding the encrypted code based on historical data and environmental conditions. The neural network model/AI is trained to recognize and decode one or more types of encrypted codes, including micro QR codes, even under sub-optimal illumination and focus conditions. In an embodiment, the method comprises providing a feedback loop in which a decoding success rate is used to continuously train and update the neural network model/AI to improve future decoding performance. In an embodiment, a multi-sensor fusion unit is configured to combine data from LiDAR, depth sensors, and image sensors to create a 3D model of the surface, thereby improving the accuracy of sizing and decoding the encrypted code.

In an embodiment, an advanced electronic device and method for decoding encrypted codes are provided, particularly focusing on very small codes such as micro QR codes. The present disclosure addresses several technical challenges associated with capturing and decoding these small codes by incorporating advanced image processing, sensor fusion, and machine learning techniques. The device contains a processor and a memory that stores executable instructions to perform various decoding tasks. The device uses one or more high-resolution image sensors to capture an image of the encrypted code. Sensors, such as LiDAR, are used to determine if the code is smaller than a predefined size, ensuring accurate size measurement. If it is determined that the code is smaller than the predefined size, the device performs a magnification process. This process can include both digital and optical zoom to enlarge the code sufficiently without losing detail. The magnification process is iterative and dynamically adjusts parameters based on real-time feedback to ensure optimal code size for decoding. The device enhances the captured image using advanced techniques such as super-resolution, noise reduction and edge sharpening. These techniques improve the clarity and quality of the image and enable more accurate decoding.

The electronic device decodes the magnified image using a pre-stored database that includes various decoding settings tailored to different types of encrypted codes, including micro QR codes. A neural network model/AI improves the decoding process by learning from historical data and adapting to real-time environmental conditions, improving both accuracy and speed. In cases where automatic decoding fails after multiple attempts, the device notifies the user through visual or auditory cues. The electronic device uses AR techniques to overlay visual instructions on the display to help the user position the device correctly to capture the code effectively. The device performs a pre-scan of the environment to determine and set optimal conditions such as ambient light, angle of incidence and potential obstacles before capturing the code. The device combines data from multiple sensors, including LiDAR, depth sensors and image sensors, to create a 3D model of the surface. This data fusion improves the accuracy of sizing and the overall decoding process.

The neural network model/AI used by the device continuously learns and updates itself based on decoding success rates and environmental feedback, improving future decoding performance. The combination of high-resolution imaging, iterative magnification and real-time enhancement ensures accurate decoding of very small, encrypted codes. Dynamic adjustment of decoding parameters and continuous learning from environmental feedback improve the device's performance under different conditions. AR guidance and user notifications improve usability, reduce manual errors and optimize the code capture process. Multi-sensor fusion provides a detailed 3D understanding of the code environment, resulting in more accurate and reliable decoding.

BRIEF DESCRIPTION OF DRAWINGS

The accompanying drawings illustrate the various embodiments of systems, methods, and other aspects of the disclosure. Any person of ordinary skill in the art will understand that the depicted element boundaries (e.g., boxes, groups of boxes, or other shapes) in the figures are an example of the boundaries. In some examples, one element may be configured as multiple elements, or multiple elements may be configured as one element. In some examples, an element shown as an internal component of one element may be implemented as an external component in another element, and vice versa. Furthermore, the elements may not be drawn to scale. Various embodiments will hereinafter be described in accordance with the appended drawings, which are provided to illustrate and not to limit the scope in any manner, wherein similar designations denote similar elements, and in which.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment. The primary objective of the present disclosure is to develop an advanced electronic device and method capable of accurately and efficiently decrypting tiny encrypted codes, such as micro QR codes. The present disclosure represents a significant advancement over existing technologies by addressing several key limitations that have hindered the decoding of miniature codes in various applications. One of the major challenges with current systems lies in the ability to capture high-resolution images of tiny encrypted codes. Existing devices often struggle to maintain clarity when capturing tiny codes due to limitations in sensor resolution, inadequate image processing, and insufficient lighting. The present disclosure overcomes these challenges by integrating high-resolution image sensors and advanced image processing techniques, including super-resolution, noise reduction, and edge sharpening. These features ensure that even the smallest encrypted codes are captured with exceptional clarity, facilitating accurate decoding. Another significant improvement offered by the present disclosure is the use of multiple sensors, including LiDAR, depth sensors, and image sensors, to accurately determine the size and location of the encrypted code. Traditional systems often rely solely on image sensors, leading to errors in size determination, particularly in complex environments. The present disclosure achieves superior precision in identifying and sizing the code, thereby enhancing the overall decoding accuracy, by incorporating a multi-sensor approach.

The iterative magnification operations, combining both digital and optical zoom, represent another leap forward in this technology. Unlike conventional systems that may rely on either digital or optical zoom alone. On another objective, the present disclosure dynamically adjusts between both zoom types based on real-time feedback and image quality. This ensures that the encrypted code is sufficiently magnified without losing critical details, which is crucial for decoding intricate symbologies like micro QR codes. Moreover, the magnification is performed rapidly, within a predefined time (1 ms-100 ms), allowing for fast and seamless decoding. Real-time image enhancement techniques further differentiate the present disclosure from existing art. The integration of AI-driven image processing allows for continuous optimization of captured images, even in suboptimal conditions such as low light, glare, or surface distortions. These enhancements significantly improve the clarity and quality of the captured images, enabling more reliable decoding even when the original code is partially degraded or obscured.

Yet another objective of the present disclosure is to incorporate a pre-stored database of settings, combined with a neural network model and AI offers a highly adaptable decoding process. Unlike conventional devices that are often limited to decoding specific code types under particular conditions, the present disclosure dynamically adjusts its settings based on the type of code, environmental factors, and historical data. Yet, another objective of the present disclosure is the neural network continuously learns from each decoding attempt, improving its accuracy and speed over time. This adaptability is especially valuable in commercial and industrial applications where encrypted codes vary widely in size, format, and environmental conditions. Furthermore, the present disclosure addresses user experience challenges by providing visual and auditory cues when decoding attempts fail. The device guides the user in correctly positioning the device for optimal code capture, by utilizing augmented reality (AR) techniques. This intuitive guidance significantly reduces user error and improves the success rate of decoding operations, especially in fast-paced or challenging environments.

Yet another objective of the present disclosure is the pre-scanning of the environment. The device analyzes factors such as ambient light, angle of incidence, and potential obstructions. Based on this analysis, the device automatically adjusts its magnification parameters, optimizing the conditions for successful code capture. This level of environmental adaptability is largely absent in current technologies, which often require manual adjustments by the user. Yet another objective of the present disclosure is to integrate data from multiple sensors to create a comprehensive 3D model of the surface, further improving the accuracy of sizing and decoding. This multi-sensor fusion allows the device to decode codes even when they are positioned on curved or uneven surfaces, where traditional 2D image-based systems would struggle. The neural network model and AI continuously learn from both historical data and real-time feedback, making the system progressively smarter and more efficient with each use. This ongoing learning process ensures that the device adapts to new code formats and challenging environments, offering long-term value and reliability for commercial applications.

Figure 1:
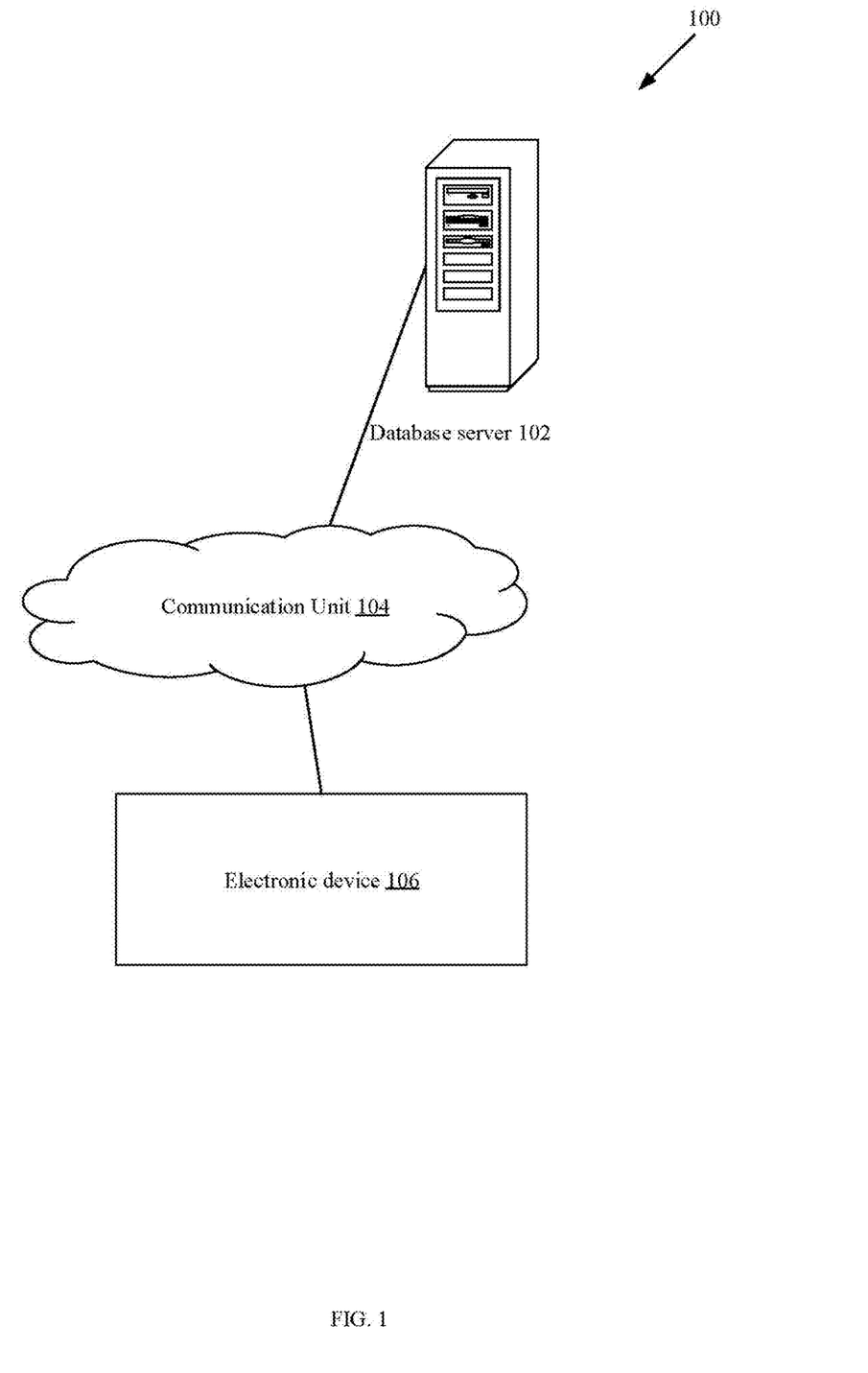
FIG. 1 is a block diagram that illustrates a system environment in which various embodiments of the method and the system may be implemented.

Yet another objective of the present disclosure is that the present disclosure significantly improves upon the limitations of existing technologies, by addressing these challenges and providing a robust, user-friendly solution for decoding very small, encrypted codes. The present disclosure's value to commerce lies in its ability to be deployed across a wide range of industries, from logistics and manufacturing to retail and healthcare, where precise and reliable decoding of micro QR codes and other small symbologies is critical for operational efficiency, security, and traceability. This advanced solution not only enhances decoding accuracy but also streamlines operations, reduces user error, and adapts to evolving technological demands, making it a valuable asset in both current and future applications. FIG. 1 is a block diagram that illustrates a system environment 100 in which various embodiments of the method and system may be implemented. The system environment 100 typically includes a database server 102, a communication unit 104, and an electronic device, 106 which are typically communicatively connected via the communication network 104.

The database server 102 includes various settings and configurations required for the decoding process and tailored to various types of encrypted codes, including micro QR codes. The database server 102 is structured to store decoding settings such as magnification parameters, image enhancement techniques, neural network model/AI configurations, and environment adaptation values. During the decoding process, the processor 202 retrieves relevant decoding settings from the database based on the type of encoded code to be decoded and the current environmental conditions. These settings control the various stages of image capture, magnification, enhancement, and decoding. The database server 102 may be updated periodically to include new decoding settings or to refine existing settings based on feedback and performance data. This procedure ensures that the device can decode encrypted codes over time. The database of decoding settings could be housed on a remote server accessible via a network connection. In such cases, the electronic device 106 could access the database server 102 via the internet or a local area network to dynamically retrieve decoding settings.

The communication unit 104 serves as a critical component for facilitating data exchange and connectivity. The communication unit 104 facilitates the transfer of data between the electronic device 106 and external sources. This includes exchanging information with other devices, accessing remote databases or servers, and receiving updates or patches. The communication unit 104 provides network connectivity options such as Wi-Fi, Bluetooth, or cellular connectivity, that allow the device to communicate with other devices or connect to the internet to access online resources. The communication unit 104 enables the provision of firmware updates or software patches, to ensure that the device remains up-to-date with the latest features and security enhancements. The communication unit 104 enables remote configuration of device settings and parameters so that administrators or users to make changes to the operation of the device without physical access. The communication unit 104 can facilitate diagnostic testing and reporting, allowing the device to transmit diagnostic data or error logs to remote servers for analysis and troubleshooting. The communication unit 104 enables integration with cloud services so that the device can store data, access cloud-based applications, and synchronize information across multiple devices or platforms. The communication unit 104 could be implemented as a hardware unit, such as a wireless network adapter or cellular modem, integrated into the hardware architecture of the electronic device.

The electronic device 106 described in the provided information serves as a primary tool for decoding encrypted codes, with a focus on very small codes such as micro QR codes. The electronic device 106 can be implemented as a mobile device, including but not limited to a smartphone, tablet, laptop, or other portable computing devices. The electronic device 106 is equipped with a processor that is responsible for executing instructions and performing computational tasks necessary for decoding operations. The electronic device 106 cooperates with a memory in which processor-executable instructions, decoding settings, neural network models, and other data necessary for the decoding process are stored. The electronic device 106 includes a display screen that provides visual feedback to the user during the decoding process. The electronic device 106 may also serve as an interface for displaying decoded information and user notifications. The electronic device 106 includes a neural network model/AI that is trained to recognize and decode various types of encrypted codes, including micro QR codes. This increases the accuracy and speed of the decoding process, especially under suboptimal conditions. The electronic device 106 has a multi-sensor fusion unit that combines combine data from LiDAR, depth sensors, and image sensors. This fusion create a 3D model of the surface, improves the accuracy of sizing and decoding. The present disclosure offers a versatile and powerful tool for decoding encrypted codes in various environments, enhancing portability and usability while maintaining high levels of performance and accuracy, by incorporating these features into a range of mobile devices.

Figure 2:
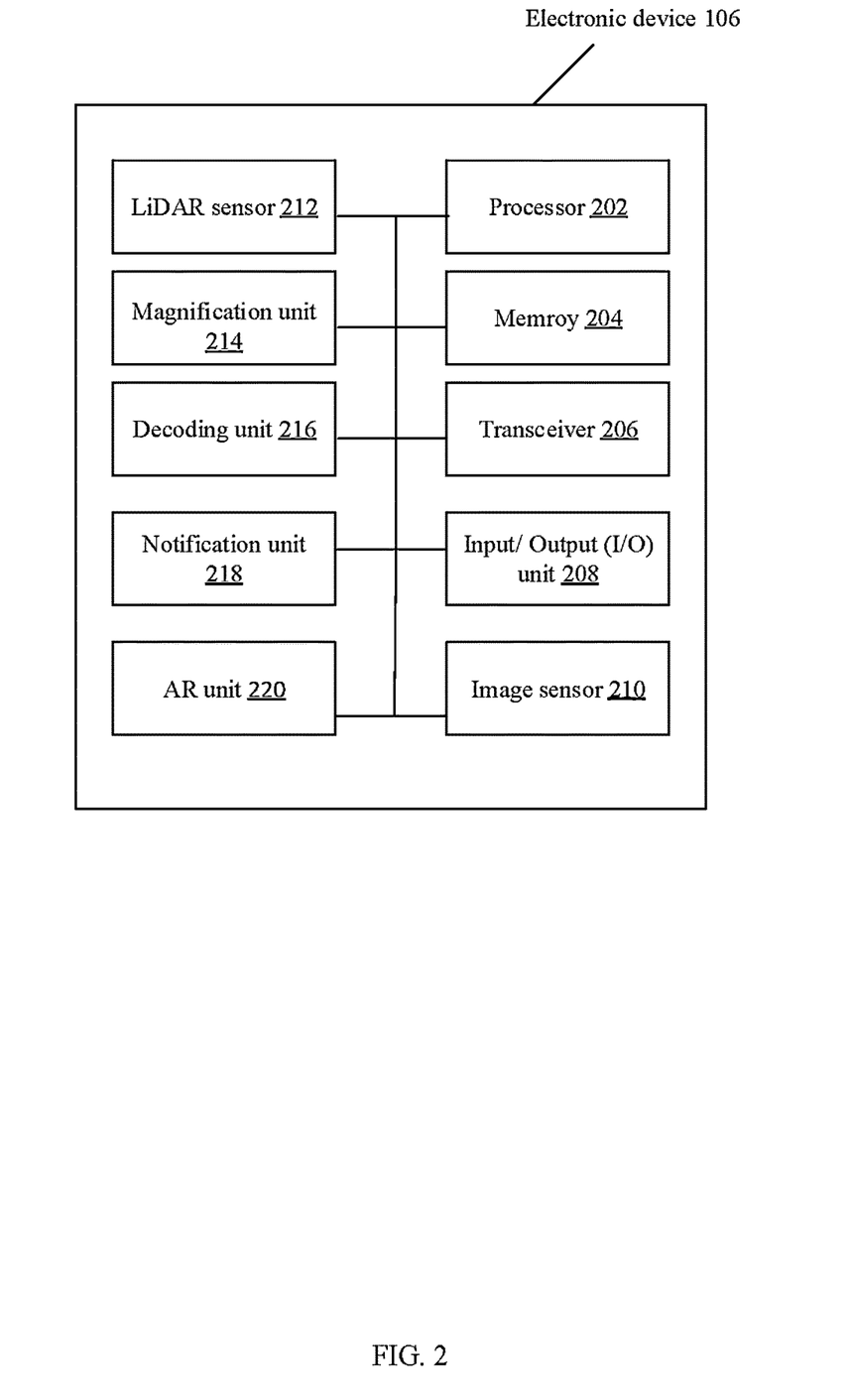
FIG. 2 is a block diagram that illustrates an electronic device configured to decode an encrypted code, in accordance with an embodiment of present disclosure.

FIG. 2 is a block diagram that illustrates an electronic device 106, in accordance with an embodiment of the present invention. FIG. 2 is explained in conjunction with elements of FIG. 1. Here, the electronic device 106 preferably includes a processor 202, a memory 204, a transceiver 206, an input/output unit 208, an image sensor 210, a LiDAR sensor 212, a magnification unit 214, decoding unit 216, a notification unit 218 and an AR unit 220.

The processor 202 comprises suitable logic, circuitry, interfaces, and/or code that may be configured to execute a set of instructions stored in the memory 204 and may be implemented based on various technologies known in the art for the processor 202. The processor 202 operates works in coordination with the transceiver 206, the input/output unit 208, an image sensor 210, a LiDAR sensor 212, a magnification unit 214, decoding unit 216, a notification unit 218 and an AR unit 220. Examples of the processor 202 include, but are not limited to, an X86-based processor, a Reduced Instruction Set Computing (RISC) processor, an Application-Specific Integrated Circuit (ASIC) processor, and a Complex Instruction Set Computing (CISC) processor.

The memory 204 includes suitable logic, circuitry, interfaces, and/or code that may be configured to store the set of instructions, executed by the processor 202. Preferably, the memory 204 is configured to store one or more programs, routines, or scripts that are executed in coordination with the processor 202. IN addition, the memory 204 may be implemented based on random access memory (RAM), a read only memory (ROM), a hard disk drive (HDD), a storage server, and/or a secure digital (SD) card.

The transceiver 206 comprises suitable logic, circuitry, interfaces, and/or code that may be configured to receive one or more attributes associated with each of the plurality of image sensors 210 and LIDAR sensors 212. The transceiver 206 enables wireless communication capabilities that allow the device to connect to Wi-Fi networks, Bluetooth-enabled devices, or cellular networks. This connectivity facilitates data exchange, firmware updates, and remote configuration. The Transceiver 206 serves as an interface for sending and receiving data packets via over wireless networks. This includes exchanging information with other devices, accessing online resources, and transferring data to and from remote servers. The Transceiver 206 supports various network protocols and standards, ensuring compatibility with different communication technologies. This versatility enables seamless integration into existing network infrastructures. The transceiver 206 can provide adjustable transmission power and bandwidth settings, allowing the device to optimize communication range and data transmission speeds according to environmental conditions and network requirements. The transceiver 206 has security features such as encryption, authentication, and data integrity checks to ensure secure communication over wireless networks. This protects sensitive information and prevents unauthorized access. The transceiver 206 could be implemented as a hardware module in the electronic device 106, which includes radio frequency (RF) components, antennas, and signal processing circuitry. Alternatively, it could be integrated into the device's system-on-chip (SoC) or connect as a separate module via interfaces such as USB or PCIe.

The input/output unit 208 includes components such as buttons, touchscreens, or touchpads that serve as user interfaces for interacting with the device. These interfaces allow the user to enter commands, trigger actions and navigate through menus. A screen, such as an LCD or OLED screen, is part of the input/output unit 208 and provides visual feedback to the user. The input/output unit 208 displays decoded information, user notifications, augmented reality (AR) overlays, and other graphical elements. The input/output unit 208 could be implemented as a combination of hardware components, including buttons, touchscreens, speakers, microphones, and connectors, integrated into the physical design of the device. Additionally, software components would work with these hardware elements to manage the functions of the input/output unit 208 and user interaction. The input/output unit 208 comprises of various input and output devices configured to communicate with the processor 202. Examples of input devices include but are not limited to, a keyboard, a mouse, a joystick, a touch screen, a microphone, a camera, and/or a docking station. Examples of the output devices include, but are not limited to, a display screen and/or a speaker.

The image sensor 210 includes suitable logic, circuitry, interfaces, and/or code that may be configured for capturing high-resolution images of the encrypted codes placed on surfaces. The image sensor converts incoming light into electronic signals, forming digital representations of the captured images. The image sensor 210 used in the electronic device 106 is capable of capturing images with high resolution to ensure clarity and detail, crucial for accurate decoding of very small codes like micro QR codes. Image sensor 210 exhibits high optical sensitivity, enabling it to capture clear images even under varying lighting conditions. This ensures reliable performance regardless of the ambient light levels. The image sensor 210 may incorporate advanced features such as backside illumination (BSI), phase detection autofocusses (PDAF), and optical image stabilization (OIS) to further enhance image quality and stability during capture. The image sensor 210 maintains accurate color reproduction, ensuring that the captured images faithfully represent the colors of the encoded codes and surrounding elements. The image sensor 210 operate at fast capture speeds to minimize motion blur and ensure sharp images, especially when capturing codes in dynamic environments or during motion. The image sensor 210 is closely integrated with the device's processor, allowing captured images to be processed quickly and efficiently for decoding purposes. The image sensor 210 could be implemented as a complementary metal-oxide-semiconductor (CMOS) or charge-coupled device (CCD) sensor, depending on the specific requirements of the device. They are typically integrated into the device's camera module, along with lenses and other optical components.

The LiDAR sensors 212 include suitable logic, circuitry, interfaces, and/or code that may be configured to accurately measure the size of the encrypted codes located on surfaces. The LiDAR sensors 212 emit laser pulses and measure the time it takes for the pulses to return after reflecting off objects, allowing for precise distance calculations. The LiDAR sensors 212 offer high accuracy in size measurement, ensuring precise determination of the dimensions of the encrypted codes. This accuracy is essential for initiating the magnification process and facilitating accurate decoding. The LiDAR sensors 212 exhibit sensitivity to varying distances, allowing them to measure the size of codes located at different distances from the device. This versatility enables the device to decode codes regardless of their proximity to the sensor. The LiDAR sensors 212 are capable of operating effectively in various environmental conditions, including indoor and outdoor settings. The LiDAR sensors 212 can adjust to factors such as ambient light levels and surface reflectivity, ensuring consistent performance. The LiDAR sensors 212 provide rapid measurements, contributing to the overall speed and efficiency of the size determination process. This fast response time minimizes delays in initiating the magnification operation and subsequent decoding. The LiDAR sensors 212 are seamlessly integrated with the electronic device's processor, allowing size measurements to be quickly processed and utilized for decoding purposes. This integration ensures efficient coordination between the sensor and decoding algorithms. The LiDAR sensors 212 can be implemented as compact, solid-state devices integrated into the electronic device's hardware architecture. They typically consist of laser emitters, photodetectors, and associated electronics for timing and signal processing.

The magnification unit 214 includes suitable logic, circuitry, interfaces, and/or code that may be configured to play a pivotal role in enlarging the captured images of encrypted codes, particularly very small ones like micro QR codes, to facilitate accurate decoding. The magnification unit 214 is responsible for increasing the size of the captured images containing encrypted codes. This enlargement is necessary to enhance the visibility and clarity of the codes, especially when dealing with very small codes. The magnification unit 214 may employ iterative techniques to progressively enlarge the captured images until the codes become sufficiently legible for decoding. This iterative approach allows for fine-tuning the magnification level to achieve optimal results. The magnification unit 214 may utilize both digital zoom and optical zoom capabilities to enlarge the images. In the magnification unit digital zoom involves enlarging the image digitally, while optical zoom adjusts the focal length of the lens to achieve magnification optically. The magnification unit 214 dynamically selects the optimal zoom type based on factors such as current image quality and feedback from image sensors 210, to optimize the magnification process. This ensures efficient use of resources and maximizes decoding accuracy. The magnification unit 214 may provide real-time feedback to the processor regarding the effectiveness of the magnification process. This feedback allows for adjustments to be made dynamically, ensuring continuous improvement in decoding performance. The magnification unit 214 operates within predefined time constraints to ensure timely decoding of the encrypted codes. These time constraints help maintain efficient processing and prevent undue delays in the decoding process. The magnification unit 214 can be implemented as a combination of hardware and software components integrated into the electronic device. Hardware components may include lenses, actuators for optical zoom, and image processing chips, while software algorithms control the magnification process and adjust parameters dynamically.

The decoding unit 216 includes suitable logic, circuitry, interfaces, and/or code that may be configured for analyzing the captured and magnified images of encrypted codes and deciphering the encoded information within them. In an embodiment, the decoding unit may be configured to implement a neural network model/AI mechanism for analyzing the captured and magnified images of encrypted codes and deciphering the encoded information within them. This process involves extracting and interpreting the encoded data. The decoding unit 216 utilizes a pre-stored database containing decoding settings tailored to various types of encrypted codes, including micro QR codes. The decoding unit 216 settings guide the decoding process and ensure compatibility with different code formats. The decoding unit 216 based on factors such as image resolution, lighting conditions, angle of approach, and magnification level. The decoding unit 216 dynamically adjusts decoding settings to optimize the decoding process. This adaptive approach improves decoding accuracy under varying conditions. The decoding unit 216 may perform real-time enhancement of captured images using advanced image processing techniques such as super-resolution, noise reduction, and edge sharpening. These enhancements improve the clarity and legibility of the encoded codes, facilitating more accurate decoding. In cases where decoding fails initially, the decoding unit 216 may iteratively refine the decoding process, adjusting parameters such as magnification level or image enhancement settings until the code is successfully deciphered. This iterative approach increases the likelihood of successful decoding. The decoding unit 216 provides feedback to the processor regarding the success or failure of decoding attempts. This feedback allows the system to adapt and improve its decoding performance over time, enhancing overall reliability. The decoding unit 216 can be implemented as a combination of hardware and software components integrated into the electronic device 106. In the decoding unit 216 software technical processes capture images, apply decoding settings, and analyze the encoded data, while hardware components provide computational resources for efficient decoding.

The notification unit 218 includes suitable logic, circuitry, interfaces, and/or code that may be configured to serve as a means of alerting users about the status of the decoding process and providing guidance when necessary. The notification unit 218 provides alerts to users regarding the status of the decoding process. This includes notifications indicating whether decoding was successful or unsuccessful, allowing users to take appropriate action. The notifications from the notification unit 218 may be delivered through both visual and auditory cues. In the notification unit 218 visual cues could include on-screen messages, icons, or indicators, while auditory cues may involve sounds including spoken words, or tones to alert users. In cases where decoding fails after iterative attempts, the notification unit 218 triggers alerts to notify users. These alerts prompt users to take corrective actions, such as adjusting the device's position or environmental conditions for better image capture. The notification unit 218 may utilize augmented reality (AR) techniques to provide visual guidance to users. In the notification unit 218 AR overlays on the device's display screen can offer instructions or cues for positioning the device correctly to capture and decode the encrypted codes. In the notification unit 218 users may interact with the notification unit 218 to acknowledge alerts or initiate specific actions. For example, users could dismiss notifications once they have viewed them or request additional assistance if needed. The notification unit's 218 settings may be customizable, allowing users to adjust notification preferences based on their preferences and requirements. This customization ensures that users receive notifications in a manner that suits their needs. The notification unit 218 can be implemented as part of the device's software system, with algorithms responsible for detecting decoding status and triggering alerts accordingly. The notification unit 218 may utilize the device's display screen, speakers, and other output mechanisms to deliver notifications to users.

The augmented reality (AR) unit 220 includes suitable logic, circuitry, interfaces, and/or code that may be configured to enhance the user experience by overlaying visual guidance on the device's display screen to aid in capturing and decoding encrypted codes. The augmented reality (AR) unit 220 overlays visual guidance elements, such as arrows, markers, or instructions, onto the device's display screen. These elements assist users in positioning the device correctly to capture images of encrypted codes. The augmented reality (AR) unit 220 overlays help users align the device's camera with the encrypted codes on surfaces. The augmented reality (AR) unit 220 assists users in achieving the optimal angle and distance for capturing clear and accurate images of the codes, by providing visual cues. The augmented reality (AR) unit 220 may display decoding instructions or tips overlaid on the display screen. These instructions guide users through the decoding process, providing iteratively guidance on capturing images, initiating decoding, and interpreting the results. The augmented reality (AR) unit 220 overlays can provide real-time feedback on the quality of captured images. For example, the augmented reality (AR) unit 220 may highlight areas where the image is blurry or out of focus, prompting users to adjust the device's position or settings for better image quality. The augmented reality (AR) unit 220 may include interactive elements that allow users to manipulate AR overlays or adjust settings directly on the display screen. This interactivity enhances user engagement and facilitates intuitive interaction with the device. In the augmented reality (AR) unit 220 Users may have the option to customize AR settings, such as the appearance of overlays or the level of assistance provided. In the augmented reality (AR) unit 220 customization options allow users to tailor the AR experience to their preferences and specific decoding needs. In the augmented reality (AR) unit 220 is implemented as part of the device's software system, utilizing AR technologies to generate and display overlays on the device's display screen. In the augmented reality (AR) unit 220 interacts closely with other components, such as the camera and image processing algorithms, to provide seamless AR guidance during the decoding process.

In an exemplary operation, the processor 202 is configured to perform a pre-scan of the environment to identify optimal conditions for capturing the encrypted code. In an embodiment, the optimal conditions comprise adjusting for ambient light, angle of incidence, and potential obstructions. In an embodiment, the processor 202 is configured to perform decoding of the encrypted code based on a pre-stored database stored within the electronic device. In an embodiment, the pre-stored database comprises a plurality of settings to decode the encrypted code, and the encrypted code corresponds to a micro QR code or any code smaller than a size of ⅛×⅛. In an embodiment, one or more sensors are configured to determine the size of an encrypted code, and one or more sensors comprises a LiDAR sensor. In an embodiment, a multi-sensor fusion unit is configured to combine data from LiDAR, depth sensors, and image sensors to create a 3D model of the surface, thereby improving the accuracy of size determination and decoding of the encrypted code.

In an embodiment, the processor 202 is configured to dynamically adjust the magnification operation parameters based on real-time feedback from the decoding process. In an embodiment, the processor 202 is configured to determine one or more settings to be applied for decoding the encrypted code based on at least one of the resolution values of the image, lighting conditions, angle of approach, and a magnification value being used by the magnification operation.

Further, the processor 202 is configured to perform real-time enhancement of the captured image using one or more advanced image processing techniques comprising at least one of super-resolution, noise reduction, and edge sharpening to facilitate the decoding process. In an embodiment, the processor is configured to iteratively perform the magnification operation until the encrypted code is decoded. In an embodiment, the magnification operation is performed within a pre-defined time. In an embodiment, the pre-defined time is between 1 ms and-100 ms, and the magnification operation comprises digital zoom and optical zoom capabilities. In an embodiment, the processor is configured to dynamically select an optimal zoom type based on a current image quality and one or more image sensor feedback.

In an embodiment, the processor 202 is configured to provide a notification to a user of the electronic device to capture the image when decoding the encrypted code fails after iteratively performing the magnification operation. In an embodiment, the notification is provided using at least one visual cue and an auditory cue. In an embodiment, the processor is configured to utilize augmented reality (AR) techniques to overlay visual guidance, on a display screen of the electronic device, aiding the user in positioning the electronic device correctly to capture and decode the encrypted code.

Figure 3:
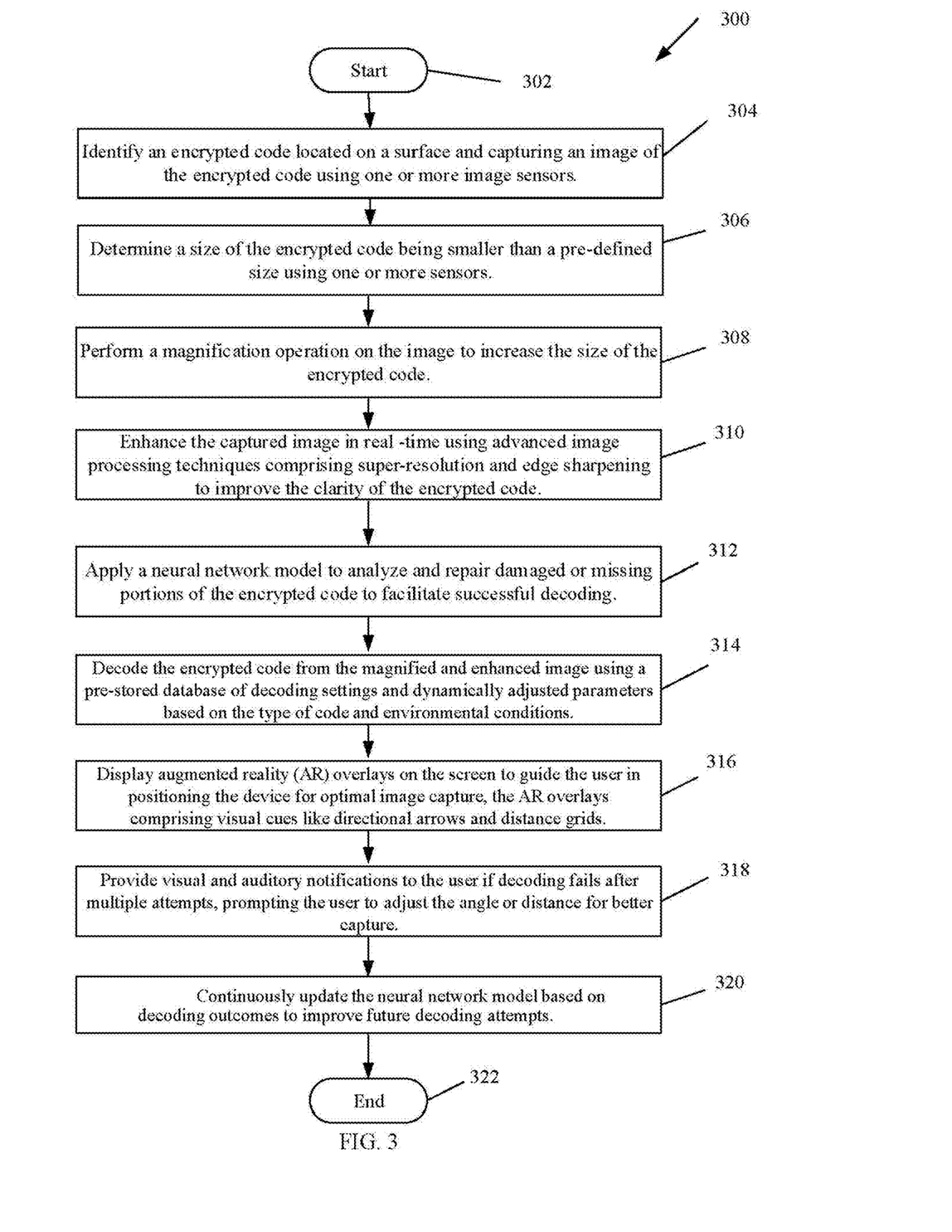
FIG. 3 is a flowchart that illustrates a method for an electronic device configured to decode an encrypted code, in accordance with an embodiment of present invention.

In an embodiment, the processor 202 is configured to utilize a neural network model/AI to improve the accuracy and speed of decoding the encrypted code based on historical data and environmental conditions. In an embodiment, the neural network model/AI is trained to recognize and decode one or more types of encrypted codes, including micro QR codes, even under suboptimal lighting and focus conditions. In an embodiment, the processor is configured to provide a feedback loop where a decoding success rate is used to continuously train and update the neural network model/Ai, improving future decoding performance. FIG. 3 is a flowchart that illustrates a method for an electronic device to decode an encrypted code, in accordance with an embodiment of present disclosure. The method begins at start step 302 and proceeds to step 304. At step 304, an electronic device identifies an encrypted code located on a surface and captures an image of the encrypted code using one or more image sensors. At step 306, an electronic device determines the size of the encrypted code is smaller than a pre-defined size using one or more sensors. At step 308, an electronic device performs a magnification operation on the image to increase the size of the encrypted code. At step 310, an electronic device enhances the captured image in real-time using advanced image processing techniques comprising super-resolution, noise reduction, and edge sharpening to improve the clarity of the encrypted code. At step 312, an electronic device applies a neural network model to analyze and repair damaged or missing portions of the encrypted code to facilitate successful decoding. At step 314, an electronic device decodes the encrypted code from the magnified and enhanced image using a pre-stored database of decoding settings and dynamically adjusted parameters based on the type of code and environmental conditions. At step 316, an electronic device displays augmented reality (AR) overlays on the screen to guide the user in positioning the device for optimal image capture, the AR overlays comprising visual cues like directional arrows and distance grids. At step 318, an electronic device provides visual and auditory notifications to the user if decoding fails after multiple attempts, prompting the user to adjust the angle or distance for better capture. At step 320, an electronic device continuously update the neural network model based on decoding outcomes to improve future decoding attempts. Control passes end step 322.

In a working example of the disclosed technology, consider a scenario where a user needs to decode a micro QR code printed on a small product label. The code is smaller than 1/8×1/8 inches, making it challenging to read with the naked eye or standard imaging techniques. A smartphone equipped with the necessary hardware and software components is used for this task. The device includes a high-performance CPU/GPU for image processing and AR rendering, memory for storing pre-stored databases and processor-executable instructions, high-resolution CMOS sensors integrated into the smartphone camera, and a LiDAR sensor for precise distance and size measurements. Additionally, it features a magnification unit with both digital and optical zoom capabilities, an AR unit for visual guidance on the display, and a notification unit for providing visual and auditory feedback to the user. The user opens the dedicated app on the smartphone and points the camera at the product label. The image sensors capture a high-resolution image of the micro QR code, while the LiDAR sensor measures the code's size and confirms it is smaller than the predefined threshold of 1/8×1/8 inches. Recognizing the need for magnification due to the small size of the code, the magnification unit initiates an iterative process, employing both digital and optical zoom techniques. The device dynamically selects the optimal zoom type based on the current image quality and feedback from the image sensors. The device performs real-time enhancement of the captured image using advanced techniques such as super-resolution, noise reduction, and edge sharpening to ensure the micro QR code is clear and legible. Additionally, the device utilizes a trained neural network AI model specifically designed to assist in recognizing and decoding micro QR codes and other challenging symbologies. The AI model analyzes the captured image, applying pattern recognition, and, if necessary, attempts to reconstruct or repair portions of the symbology that may be damaged or poorly captured due to lighting, focus, or surface imperfections. The decoding unit then uses the pre-stored database to apply the appropriate decoding settings based on the code type, analyzing the magnified and enhanced image, alongside the AI-corrected data, to extract the encoded information. If the initial decoding attempt is unsuccessful, the device iteratively refines the magnification, enhancement, and AI correction parameters until decoding is successful or the maximum predefined time of 100 ms is reached. The AI continuously learns from failed attempts and successful corrections, improving its accuracy in future decoding tasks.

If decoding fails after several attempts, the notification unit provides feedback to the user through visual cues, such as flashing icons on the screen, and auditory cues, such as beeps. The AR unit overlays visual guidance on the display, helping the user reposition the device or adjust the angle for better image capture, with customizable visual overlays displaying arrows and instructions. Once the code is successfully decoded, the device displays the decoded information on the screen and may provide a confirmation sound.

Another detailed working example of the present disclosure involves a smartphone equipped with advanced image sensors, a LiDAR sensor, depth sensors, and a high-performance processor. The device also includes memory that stores processor-executable instructions, a decoding settings database, and a neural network model/AI. Additionally, it features an augmented reality (AR) display for visual guidance to ensure accurate positioning. In this example, the product label contains a micro QR code with encoded information. The device's image sensors capture an image of the micro QR code on the product label, with specific parameters including a 12-megapixel resolution and indoor fluorescent lighting at a 90-degree angle of approach. The LiDAR and depth sensors determine the size of the micro QR code, which is 2 mm×2 mm. Since the size is smaller than the predefined threshold, the device initiates a magnification operation using both digital and optical zoom techniques, achieving a 2× zoom level combined with real-time image enhancement to improve clarity and quality.

The processor then decodes the magnified image of the micro QR code using the pre-stored database of decoding settings and the neural network model/AI. The appropriate decoding parameters are retrieved from the database based on the code type. If the decoding process fails after several attempts, the device provides visual cues through the AR display to assist the user in accurately positioning the device. AR guidance overlays include arrows indicating the correct angle of approach and a grid showing the optimal distance from the product label. Importantly, if the symbology is too small or partially missing—such as when parts of the code are not fully captured (e.g., a missing corner or incomplete edges)—the AI component of the device comes into play. The neural network model is specifically designed to detect and attempt repairs on incomplete or distorted symbology. It analyzes the captured data, predicts the missing or damaged portions based on learned patterns, and reconstructs the symbology to make it fully readable. This AI-driven repair process is critical for ensuring accurate decoding, even when the initial capture is suboptimal.

Before capturing the image, the device performs a pre-scan of the environment to adjust for optimal conditions, such as ambient light correction and angle of incidence correction. The success rate of decoding attempts is used to continuously train and update the neural network model/AI, enhancing future decoding performance. Ultimately, the device successfully decodes the micro QR code on the product label and displays the retrieved information on the screen, providing valuable data to the user. Various embodiments of the disclosure encompass numerous advantages including the present disclosure effectively decodes very small encrypted codes, such as micro QR codes, with high accuracy by employing advanced image processing and sensor fusion techniques. Real-time image enhancement techniques, including super-resolution, noise reduction, and edge sharpening, improve the clarity and quality of captured images, facilitating more reliable decoding. The iterative magnification process combines digital and optical zoom, ensuring that the encrypted code is enlarged sufficiently without losing detail or clarity. This adaptive magnification approach enhances the decoding accuracy. The use of multiple sensors, including LiDAR, depth sensors, and image sensors, allows for accurate size determination and creates a detailed 3D model of the surface, improving the overall decoding process. The present disclosure performs a pre-scan of the environment to adjust for optimal conditions such as ambient light and angle of incidence and dynamically adjusts magnification parameters based on real-time feedback. The present disclosure ensures consistent performance under varying conditions. The device adjusts decoding settings dynamically based on factors such as image resolution, lighting conditions, angle of approach, and magnification value. This adaptability ensures optimal decoding performance for different code types and environmental conditions. The neural network model/AI continuously learns from historical data and real-time feedback, improving the accuracy and speed of decoding over time. The feedback loop allows the system to adapt and enhance its performance with each use. The device provides visual and auditory cues when automatic decoding fails and uses augmented reality (AR) techniques to overlay visual guidance on the display. This aids users in correctly positioning the device, reducing manual errors and optimizing the code capture process. The processor is designed to perform magnification and decoding operations within a predefined time frame (1 ms to 100 ms), ensuring fast and efficient processing of encrypted codes.

The present disclosure is capable of decoding encrypted codes accurately even under suboptimal lighting and focus conditions, thanks to the advanced image processing and adaptive learning algorithms. The device utilizes a pre-stored database containing a variety of decoding settings tailored for different types of encrypted codes, enhancing its ability to decode a wide range of codes accurately. The fusion of data from LiDAR, depth sensors, and image sensors enhances the accuracy of size determination and the overall decoding process, making it robust against environmental variations.

The present disclosure involves specific, tangible components and processes to achieve its objectives. The present disclosure involves concrete physical components, such as a processor, memory, image sensors, LiDAR, and depth sensors, which are used to capture and decode encrypted codes. The present disclosure specifies a series of detailed, technical steps, such as capturing an image of the encrypted code, determining its size, performing magnification, and applying real-time image enhancement. These steps are clearly defined and operational, involving specific technical procedures. In the present disclosure, the processes involve technical implementation details, such as the use of digital and optical zoom, dynamic parameter adjustment, and iterative magnification, which are grounded in the physical operation of hardware and software systems. The present disclosure addresses real-world problems associated with decoding very small, encrypted codes in various environments, which requires interaction with and manipulation of physical entities and data.

The present disclosure uniquely combines data from multiple sensors (LiDAR, depth sensors, and image sensors) to create a detailed 3D model for accurate size determination and decoding. This multi-sensor fusion approach is not a straightforward application of existing technologies and involves innovative integration. The iterative magnification process that dynamically adjusts parameters based on real-time feedback is a sophisticated technique that goes beyond simple zoom functions. It involves complex algorithms and decision-making processes that would not be immediately obvious. Applying real-time image enhancement techniques like super-resolution, noise reduction, and edge sharpening in the context of decoding very small, encrypted codes involves advanced image processing knowledge and implementation.

The continuous use of learning neural network model/AI that adapts based on historical data and real-time feedback to improve decoding accuracy and speed is an innovative approach. Training such a model to handle various environmental conditions and code types requires specialized expertise and is not a trivial extension of existing machine-learning applications. Incorporating AR techniques to visually guide to users in correctly positioning the device for optimal code capture is a technical solution that combines AR with image processing and decoding. Performing a pre-scan of the environment to adjust for optimal conditions such as ambient light and angle of incidence prior to capturing the code demonstrates a level of foresight and innovation that goes beyond conventional methods. The strength of the present disclosure lies in the combination of various advanced features, including sensor fusion, iterative magnification, real-time image enhancement, adaptive neural networks, and AR guidance.

Unlike purely theoretical concepts the present disclosure directly addresses the practical challenges of decoding extremely small, encrypted codes by leveraging a combination of physical sensors (such as LiDAR, depth sensors, and image sensors) and sophisticated software processes. These elements work together to enhance the accuracy and efficiency of decoding under various real-world conditions.

The technical advancement of this disclosure is evident in its use of multi-sensor fusion, which integrates data from LiDAR, depth sensors, and image sensors to construct a detailed 3D model of the environment and perform neural network model/AI-based processing to repair incomplete or partially captured symbology in the encrypted code. This integration provides a holistic approach to size determination and environmental assessment, enabling the decoding process to adapt dynamically to different conditions, which is a significant improvement over conventional systems that rely on simpler, less responsive techniques.

The iterative magnification process introduces an improved technical approach to image processing, using real-time feedback to adjust magnification parameters dynamically. This ensures that the encrypted code is enlarged with precision without losing clarity or resolution. This adaptive magnification requires advanced decision-making grounded in the physical operation of both hardware and software systems. Further, real-time image enhancement techniques, such as super-resolution, noise reduction, and edge sharpening, are applied specifically to the context of decoding very small, encrypted codes. These implementations enhance the quality and clarity of captured images and require specialized knowledge in image processing.

Additionally, the continuous use of a learning neural network model represents another layer of technical sophistication. This neural network model/AI improves the accuracy and speed of decoding by learning from historical data and adapting in real-time based on immediate feedback. Training such a neural network to handle diverse environmental conditions and various code types requires specialized expertise, demonstrating that this disclosure provides a practical solution grounded in advanced machine learning and artificial intelligence techniques.

Further, the incorporation of augmented reality (AR) techniques to provide visual guidance to users introduces an improved user interface solution that combines AR with real-time image processing and decoding functions. This integration provides tangible improvements in usability and accuracy, making the decoding process more intuitive and reliable for users, thereby reducing the likelihood of manual errors. The proactive pre-scan of the environment to adjust for optimal conditions, such as ambient light and angle of incidence, demonstrates foresight and innovation. This capability ensures that the system is optimized before capturing the code, which offers a clear technical advantage over conventional methods that may not account for these environmental factors. A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments falling within the scope of the appended claims.

What is claimed is:

1. An electronic device to decode an encrypted code, the electronic device comprising:
    a processor;
    a memory, communicatively coupled with the processor, wherein the memory stores processor-executable instructions, which on execution cause the processor to:
        identify an encrypted code located on a surface and capture an image of the encrypted code using at least one image sensor;
        determine that the size of the encrypted code is no larger than $\frac{1}{8} \times \frac{1}{8}$ inches using at least one sensor, the at least one sensor including at least one LiDAR sensor;
        perform a magnification operation iteratively on the image to increase the perceived size of the encrypted code until the code is decoded, wherein the magnification operation being performed within a pre-defined time, wherein the pre-defined time is between 1 ms-100 ms, and wherein the magnification operation comprises digital zoom and optical zoom capabilities and wherein the processor is configured to dynamically select an optimal zoom type based on a current image quality and the at least one image sensor's feedback;
        enhance the captured image in real-time using advanced image processing techniques selected from the set of processing techniques consisting of: super-resolution, noise reduction, and edge sharpening, to improve the clarity of the encrypted code;
        apply a neural network model to analyze and repair portions of the encrypted code to facilitate successful decoding;
        decode the encrypted code from the magnified and enhanced image using a pre-stored database containing a plurality of decoding settings and dynamically adjusted parameters based on the type of code and environmental conditions;
        display augmented reality (AR) overlays on the screen to guide the user in positioning the device for optimal image capture, the AR overlays comprising at least one visual cues selected from the set of visual cues consisting of: directional arrows and distance grids;
        provide notifications to the user if decoding fails after multiple attempts, prompting the user to adjust position of the at least one image sensor for better capture; and
        continuously update the neural network model based on decoding outcomes to improve future decoding attempts.

2. The electronic device to decode the encrypted code as claimed in claim 1, wherein the magnification operation comprising both digital and optical zoom techniques, dynamically selected based on real-time image quality analysis.

3. The electronic device to decode the encrypted code as claimed in claim 1, wherein the processor is configured to determine at least one setting to be applied for decoding the encrypted code based on at least one of a resolution value of the image, lighting conditions, angle of approach, and a magnification value being used by the magnification operation.

4. The electronic device to decode the encrypted code as claimed in claim 1, wherein the processor is configured to provide a notification to a user of the electronic device to capture the image when decoding the encrypted code fails after iteratively performing the magnification operation, and wherein the notification being provided using at least one of a visual cue and an auditory cue, and wherein the processor is configured to utilize augmented reality (AR) techniques to overlay visual guidance, on a display screen of the electronic device, aiding the user in positioning the electronic device correctly to capture and decode the encrypted code.

5. The electronic device to decode the encrypted code as claimed in claim 1, wherein the processor is configured to perform a pre-scan of the environment to identify and adjust to optimal conditions for capturing the encrypted code, wherein the adjustments are selected from the set of adjustments consisting of: adjusting for ambient light, adjusting for angle of incidence, and adjusting for potential obstructions.

6. The electronic device to decode the encrypted code as claimed in claim 1, wherein the processor is configured to dynamically adjust the magnification operation parameters based on real-time feedback from the decoding process.

7. The electronic device to decode the encrypted code as claimed in claim 1, wherein the processor is configured to utilize a neural network model/AI to improve an accuracy and a speed of decoding the encrypted code based on historical data and environmental conditions, and wherein the neural network model/AI is trained to recognize and decode at least one types of encrypted codes, including micro QR codes, even under suboptimal lighting and focus conditions, and wherein the processor is configured to provide a feedback loop where a decoding success rate is used to continuously train and update the neural network model/AI, improving future decoding performance.

8. The electronic device to decode the encrypted code as claimed in claim 1, further comprises a neural network model/AI-based processing to repair symbology in the encrypted code, wherein the neural network model is trained to predict and reconstruct portions of the symbology based on historical data and learned patterns, and wherein the repaired symbology is subsequently decoded using pre-stored settings and dynamic adjustments informed by real-time feedback from the decoding process.

9. A method for decoding an encrypted code, the method comprising:
   identifying, by an electronic device, an encrypted code located on a surface and capture an image of the encrypted code using at least one image sensors the at least one sensors further comprising at least one LiDAR sensor;
   determining, by an electronic device, that the size of the encrypted code is no larger than ⅛×⅛ inches using at least one sensors;
   iteratively performing, by an electronic device, a magnification operation on the image to increase the perceived size of the encrypted code until the code is decoded, wherein the magnification operation being performed within a pre-defined time, wherein the pre-defined time is between 1 ms-100 ms, and wherein the magnification operation comprises digital zoom and optical zoom capabilities, and dynamically selecting an optimal zoom type based on a current image quality and the at least one image sensor's feedback;
   enhancing, by an electronic device, the captured image in real-time using advanced image processing techniques selected from the set of advanced image processing techniques consisting of: super-resolution, noise reduction, and edge sharpening, to improve the clarity of the encrypted code;
   applying, by an electronic device, a neural network model to analyze and repair portions of the encrypted code to facilitate successful decoding;
   decoding, by an electronic device, the encrypted code from the magnified and enhanced image using a pre-stored database containing a plurality of decoding settings and dynamically adjusted parameters based on the type of code and environmental conditions;
   displaying, by an electronic device augmented reality (AR) overlays on the screen to guide the user in positioning the device for optimal image capture, the AR overlays being selected from the set of AR overlays consisting of: directional arrows and distance grids;
   providing, by an electronic device, notifications to the user if decoding fails after multiple attempts, prompting the user to adjust a position of the at least one image sensor for better capture; and
   continuously updating, by an electronic device, the neural network model based on decoding outcomes to improve future decoding attempts.

10. The method for decoding the encrypted code as claimed in claim 9, further comprising:
    determining at least one setting to be applied for decoding the encrypted code based on at least one parameter selected from the set of parameters consisting of: a resolution value of the image, lighting conditions, angle of approach, and a magnification value being used by the magnification operation.

11. The method for decoding the encrypted code as claimed in claim 9, further comprising
    performing a pre-scan of the environment to identify and adjust to optimal conditions for capturing the encrypted code, wherein the adjustments are selected from the set of adjustments consisting of: adjusting for ambient light, adjusting for angle of incidence, and adjusting for potential obstructions.

12. The method for decoding the encrypted code as claimed in claim 9, further comprising dynamically adjusting the magnification operation parameters based on real-time feedback from the decoding process.

13. The method for decoding the encrypted code as claimed in claim 9, further comprising
    utilizing a neural network model/AI to improve an accuracy and a speed of decoding the encrypted code based on historical data and environmental conditions, and wherein the neural network model/AI is trained to recognize and decode encrypted codes even under suboptimal lighting and focus conditions, and
    providing a feedback loop where a decoding success rate is used to continuously train and update the neural network model/AI, improving future decoding performance.

14. The method for decoding the encrypted code as claimed in claim 9, further comprises a step of utilizing a neural network model and AI-based processing to repair symbology in the encrypted code, wherein the neural network model is trained to predict and reconstruct portions of the symbology based on historical data and learned patterns, and wherein the repaired symbology is subsequently decoded using pre-stored settings and dynamic adjustments informed by real-time feedback from the decoding process.

* * * * *